Figure 1:
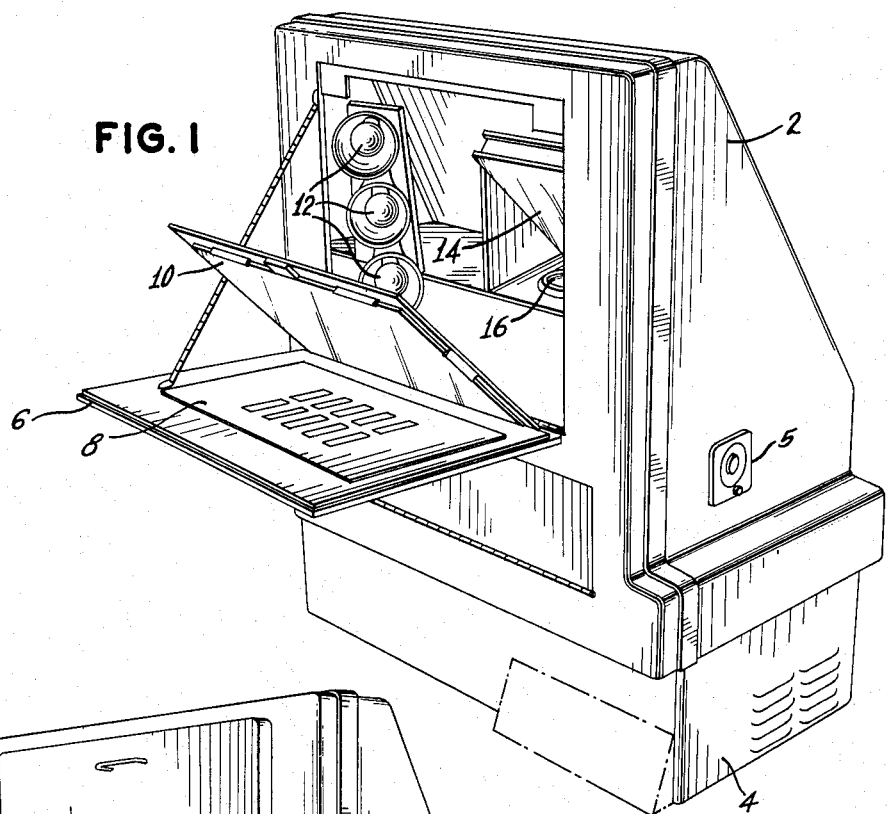

June 21, 1966  H. H. WEICHARDT  3,256,792
ELECTROPHOTOGRAPHIC APPARATUS AND PROCESS
Filed Dec. 19, 1963  4 Sheets-Sheet 1

INVENTOR.
HEINZ H. WEICHARDT
BY
ATTORNEY

June 21, 1966 H. H. WEICHARDT 3,256,792
ELECTROPHOTOGRAPHIC APPARATUS AND PROCESS
Filed Dec. 19, 1963 4 Sheets-Sheet 2

INVENTOR.
HEINZ H. WEICHARDT
BY
James E. Bryan
ATTORNEY

INVENTOR.
HEINZ H. WEICHARDT
BY
James E. Bryan
ATTORNEY

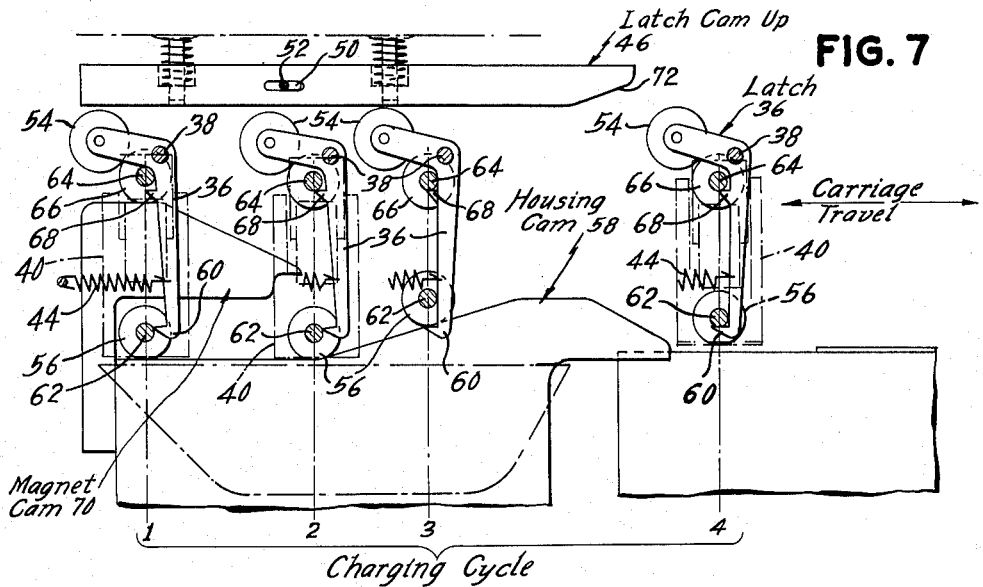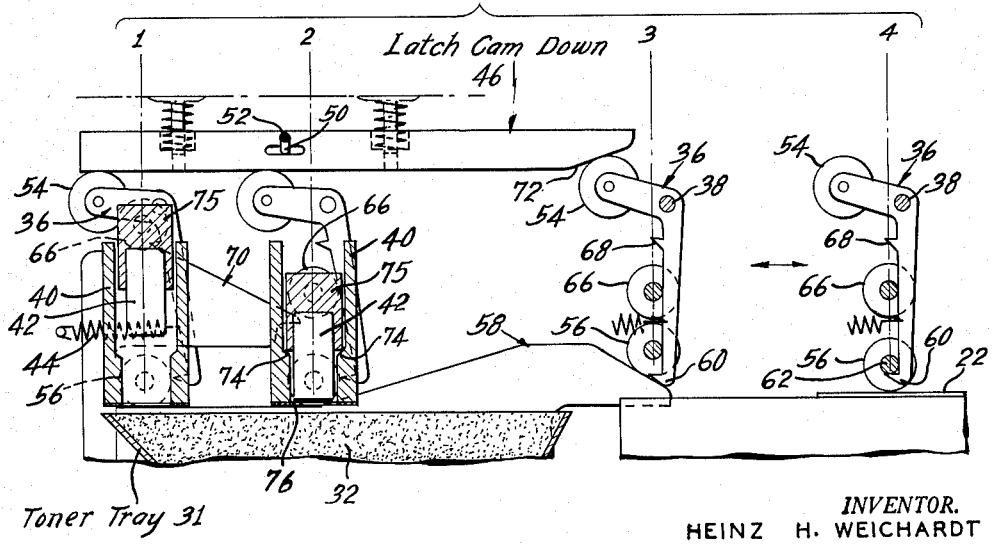

United States Patent Office 3,256,792
Patented June 21, 1966

3,256,792
ELECTROPHOTOGRAPHIC APPARATUS
AND PROCESS
Heinz H. Weichardt, Spring Valley, N.Y., assignor to
Azoplate Corporation, Murray Hill, N.J.
Filed Dec. 19, 1963, Ser. No. 331,710
6 Claims. (Cl. 95—1.7)

This invention relates to an electrophotographic apparatus and to an electrophotographic process, i.e., a process in which an electrostatic latent image is produced by utilizing the property of photoconductivity, which is a variable conductivity dependent upon the intensity of illumination to which a photoconductive material is exposed. The electrostatic latent image may be produced in a conventional exposure operation, for example by means of a lens-projected image, whereby an invisible electrostatic charge pattern, the electrostatic latent image, is created on a surface, in which pattern the charge density at any point is related to the intensity of illumination obtaining at that point during exposure to light. The latent image may be developed, i.e., rendered visible, by means of an electroscopic powder, such as a colored synthetic resin powder, and the resulting visible image may be fixed by rendering the powder permanently adherent to a support on which the image is desired, for example, by heating to soften or melt the powder particles and/or the surface of the image support, or by treating the non-fixed powder image with volatile solvents.

In electrophotographic processes, the electrostatic latent image is formed on the surface of a photoconductive insulating layer carried on a support. For example, material comprising such a support and photoconductive layer may be sensitized by applying an electrostatic charge to the free surface of the photoconductive layer. Such surface charge may be applied, for example, by means of a corona discharge, the charge being retained due to the substantial insulating character, i.e., the low conductivity of the layer, when not exposed to light. Upon exposure, as described above, the photoconductive property of the layer causes the conductivity to increase in the illuminated areas to an extent dependent upon the intensity of illumination, whereby the surface charge in the illuminated areas leaks away, leaving the charge located in the unilluminated areas. This remaining charge constitutes the charge pattern or electrostatic latent image.

Latent electrostatic images which are developed by treatment with a suitable electroscopic powder and which are then fixed by heating, for example, can be used in the preparation of printing plates by hydrophilizing the non-image areas of the photoconductive layer in known manner.

In accordance with the present invention, a novel apparatus is provided for the production of copies by an electrophotographic process. The apparatus can be used to produce copies on any type of electrophotographic material, i.e., material having a metal, plastic, or paper backing and using inorganic or organic photoconductors or mixtures thereof. The apparatus of the invention is, however, particularly applicable to the production of lithographic masters using an electrophotographic material having a metallic or paper backing and a photoconductive layer thereon. One type of electrophotographic material which may be processed in the apparatus of the present invention with particularly favorable results is that disclosed in copending application, Ser. No. 258,691, filed Feb. 15, 1963.

The invention will be further illustrated by reference to the accompanying drawings in which one embodiment of the apparatus of the present invention is disclosed.

Figure 2:
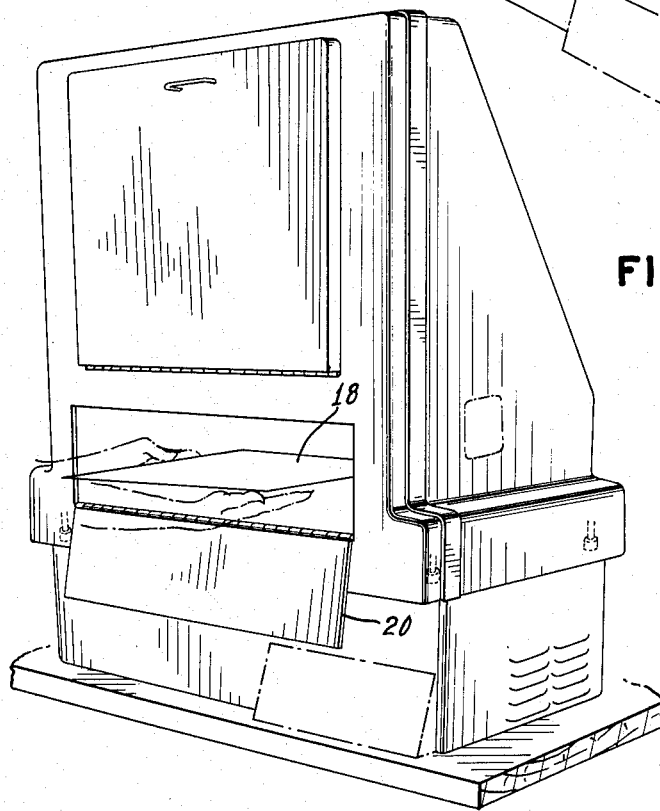
Figure 3:
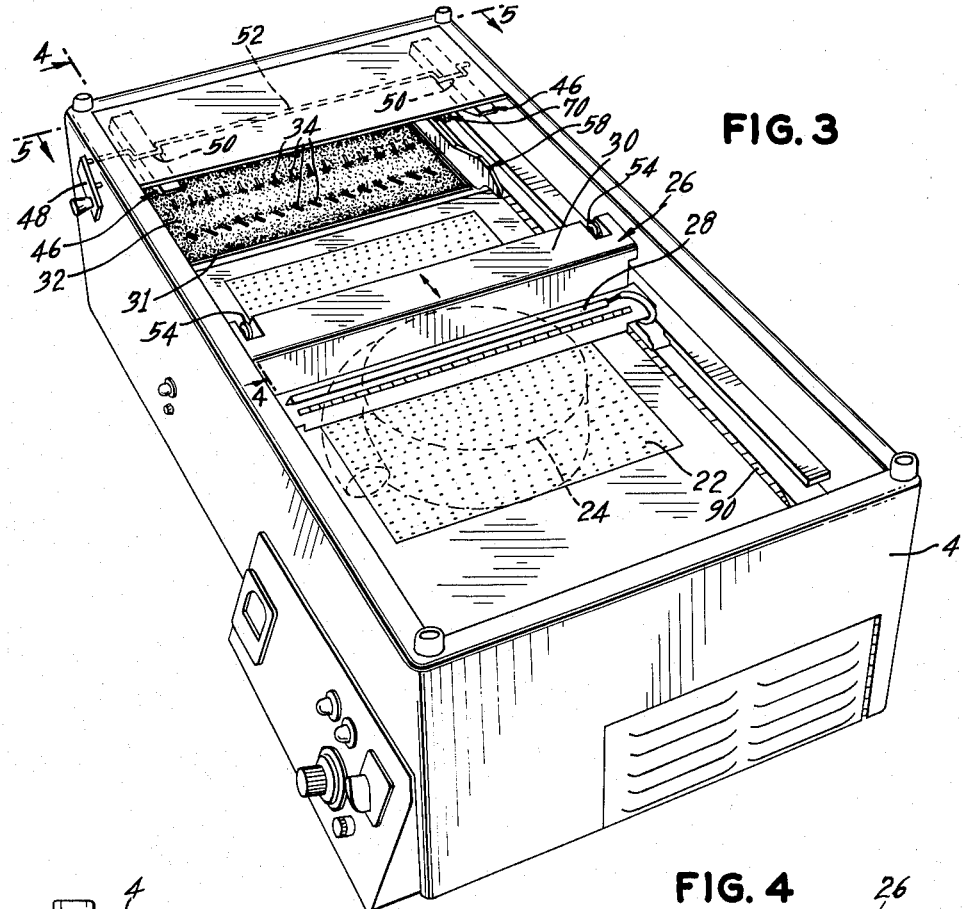
Figure 4:
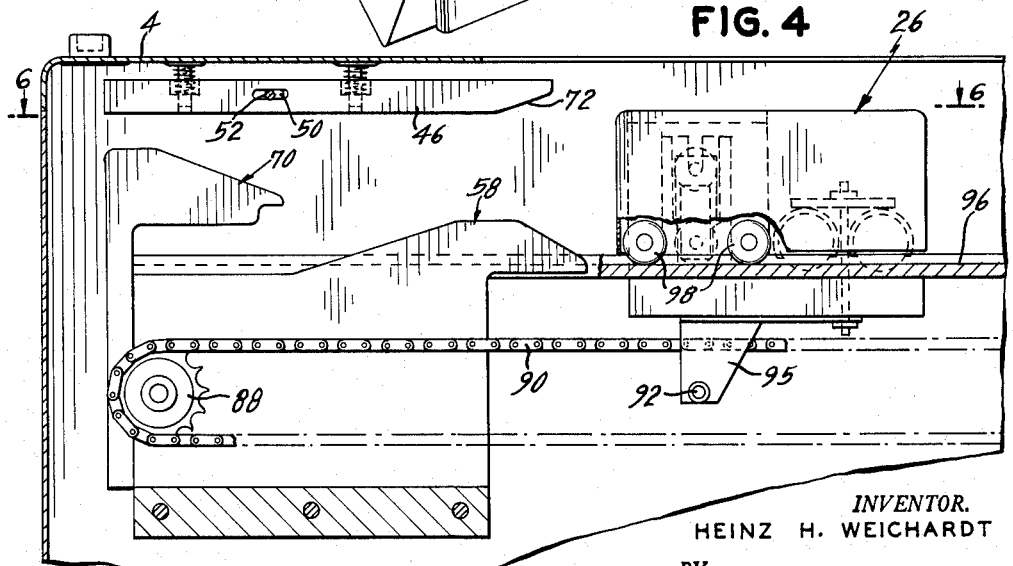
Figure 5:
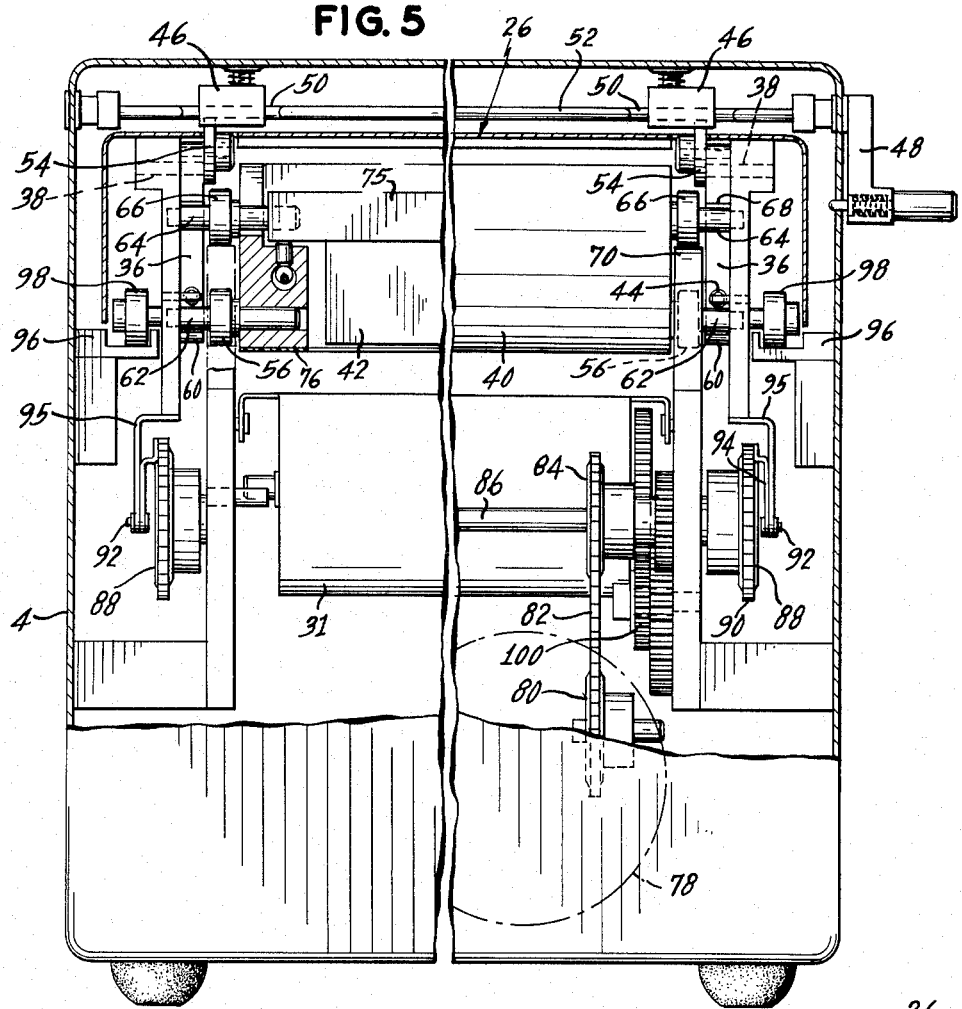
Figure 6:
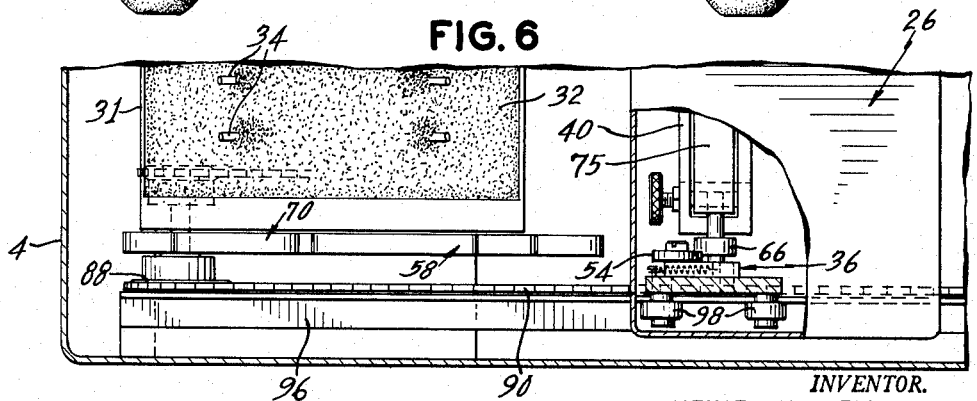

FIGURE 1 is a perspective view of the apparatus of the present invention showing the upper door of the housing in the open position to receive a master to be copied, FIGURE 2 is a perspective view of the apparatus of FIGURE 1, showing the upper door in the closed position and the lower door open to receive an electrophotographic material, FIGURE 3 is a perspective view of the lower portion of the apparatus shown in FIGURES 1 and 2, with the upper portion of the housing removed, FIGURE 4 is a view in section taken on line 4—4 of FIGURE 3 and looking in the direction of the arrows, FIGURE 5 is a view in section taken on line 5—5 of FIGURE 3 and looking in the direction of the arrows, FIGURE 6 is a view in section taken on line 6—6 of FIGURE 4, FIGURE 7 is a schematic view showing four positions of the toning assembly during the charging cycle of the apparatus, and FIGURE 8 is a schematic view showing four positions of the toning assembly of the apparatus during the toning cycle.

Referring to FIGURE 1, the apparatus includes a housing generally divided into an upper portion 2 and a lower portion 4. The housing is made into two parts in order to facilitate access to the interior thereof but it may, if desired, be made integral. The upper portion of the housing 2 has an automatic timer 5 and a door 6 thereon. The latter supports a plate 8 which receives an original to be copied in the apparatus. The master or original, not shown, is held securely in position on the plate 8 by the glass cover 10 which is hinged to the door 6. Within the upper housing 2 are a plurality of light bulbs 12 which are employed to illuminate the original or master during the exposure cycle of the electrophotographic process. The light image of the original or master, supported between the plate 8 and glass cover 10, is projected by means of the mirror 14 and the lens 16 into the lower portion of the housing where it strikes an electrophotographic material 18, shown being placed into the apparatus through the open door 20 in FIGURE 2.

As shown in FIGURE 3, the electrophotographic material is securely retained in position within the lower housing 4 by being placed upon a perforated platen or vacuum plate 22 which has suction applied thereto by means of the blower 24 which is actuated by a motor, not shown.

Mounted for reciprocation, i.e., travel back and forth longitudinally of the lower housing 4, is a carriage generally indicated at 26. The carriage has mounted thereon an electrostatic charging device, i.e., the corona wires 28, and the housing 30 for the toning assembly. At the left hand end of the device, as shown in FIGURE 3, is a tray 31 containing a quantity of toner 32, the toner being maintained in a continuous state of agitation by an agitator comprising a rotatable shaft having a plurality of rods 34 connected thereto.

The construction of the toning mechanism contained within the housing 30 is best described by reference to FIGURES 4, 7, and 8. The toning mechanism consists of a pair of latches 36 which are pivotally supported within the housing 30 on the shaft 38. Within the housing 30 is another housing 40 for a magnet 42, which may be either a permanent magnet or an electromagnet. The latches 36 are continuously biased in a clockwise direction, as shown in FIGURE 7 and FIGURE 8, by the springs 44 which are connected to the lower end of the latches 36 at one end and to the housing 40 at the other end. During the charging cycle, i.e., when the electrophotographic material is being electrostatically charged, it is necessary to maintain the magnet and the toner housing 40 out of contact with the electrophotographic material. This is effected, as shown in FIGURE 7, by raising the latch cams 46 by turning the crank 48, shown in FIGURE 3. The turning of the crank 48 effects the rotation of the eccentric portions 50 on the shaft 52, thereby permitting the latch cams to rise against the action of the wheels 54 on the latches 36, the wheels 54 being biased in a clockwise direction by the springs 44. As the carriage 26 moves to the right, as shown in FIGURE 7, during the charging cycle, the wheels 56, which support the housing 40, ride up over the housing cams 58, as shown at positions 2 and 3 in FIGURE 7, and, upon passing over the housing cams to position 4 in FIGURE 7, the wheels 56 and the housing 40 are maintained in a raised position by engagement of the lower projections 60 on the latches with the axle 62 upon which the wheels 56 are mounted.

Simultaneously with the movement of the carriage to the right, as shown in FIGURE 7, the axle 64, upon which the magnet cam wheels 56 are mounted, is engaged by the upper projections 68 on the latches 36. The engagement of the axle 64 with the latch projections 68 is effected by the wheels 66 rolling down the magnet cams 70 to a point where the engagement of the latches and axle takes place. The magnet 42 is connected to the axle 64 and, accordingly, is maintained in the raised position, shown at position 4 in FIGURE 7, during the charging cycle.

After charging of the electrophotographic material, the toning assembly returns to position 1 shown in FIGURE 7 and, after the exposure cycle, the toning cycle begins. The toning cycle is effected by rotating the crank 48 to depress the eccentrics 50 and the latch cams 46. The depression of the latch cams 46 rotates the latches 36 in a counterclockwise direction, as shown at positions 1 and 2 in FIGURE 8. As the housing 40 moves to the right, as shown in FIGURE 8, the wheels 66 roll down the magnet cams 70, thereby lowering the magnet 42 adjacent the toner 32 in the toner tray 31. As the toner assembly continues to move to the right, the housing wheels 56 ride up over the housing cams 58 and, upon riding down the opposite sides of the housing cams, as shown at position 3 in FIGURE 8, the latches are again biased in a counterclockwise direction as a result of the wheels 54 riding over the beveled portions 72 of the latch cams. The clockwise rotation of the latches 36 results in an engagement of the lower projections 60 of the latches with the axle 62, with the result that the housing 40 is maintained in the raised position, as shown at position 4 in FIGURE 8. The axle 64 and the magnet 42, however, remain in the lowered position which they occupied at positions 2 and 3 of FIGURE 8, the magnet 42 being retained within the housing 40 by the shoulder 74 on the interior of the housing, the magnet being slidably mounted within the housing on the support 75. Thus, as the toning assembly moves to the right in FIGURE 8, the magnet having a quantity of toner adhered thereto, will deposit the toner on the electrostatic latent image during the movement of the magnet across the electrophotographic material. Upon the return of the toner assembly to the left, as shown in FIGURE 8, the wheels 56 will again ride up over the housing cams 58 and the wheels 66 will ride up over the magnet cams 70. As the wheels 66 ride up over the magnet cams, the magnet connected thereto will be raised within the housing 40 and the toner adhering thereto will fall back into the toner tray 31 since the end of the housing 40 is covered with a plastic sheet or membrane 76 and the magnetic attraction of the magnet in the raised position, shown at 1 in FIGURE 8, is insufficient to retain the toner adhered to the plastic membrane 76. Accordingly, the toner will drop back into the toner mixture 32 in the tray 31 to be mixed therewith by the agitating means 34.

The driving mechanism for the apparatus is best shown in FIGURE 5 in which the driving motor 78, shown in phantom, is coupled to the drive sprocket 80 through a reduction gear, not shown. The chain 82 drives the sprocket 84 on the shaft 86; the shaft 86 also has the sprockets 88 thereon which drive the driving chains 90 for moving the carriage 26. The chains 90 are connected to the carriage 26 by means of couplings which are pivoted about the pins 92. An arm 94 is attached to each pin 92 at one end and to the chain 90 at the opposite end so that when the carriage 26 reaches its maximum travel to the right, as shown in FIGURE 4, the arm 94 pivots about the pin 92 and the continuing travel of the chain will return the carriage to the left hand position, as shown in FIGURE 4. The carriage 26 is connected to the pins 92 by the arms 95.

The carriage 26 is supported on a pair of rails 96 and rides on the wheels 98. The magnet 42 is supported, as shown in FIGURE 5, by the magnet wheels 66 and the shaft 64. The housing wheels 56 also are shown supported on the shaft 62. Also shown is the transmission or drive 100 to the stirrer or agitator.

The electrical circuitry required to operate the apparatus of the present invention is not novel and can be easily supplied by one skilled in the art. The circuitry is, therefore, not shown.

The operation of the device is as follows: the blower motor is started under the vacuum platen 24 and the paper- or metal-backed electrophotographic material is placed thereon in the manner shown in FIGURE 2 of the drawings. The original or master to be copied is placed on the plate 8 and locked in place by means of the cover 10 shown in FIGURE 1 of the drawings; the doors 6 and 20 are then closed. The lever or crank 48, which operates the latching cams is turned to a position so that the latching cams 46 are raised. With the latching cams in the raised position, the latches maintain the magnet assembly 42 in the raised position within the housing 40.

The drive motor is then started and the carriage 26 moves toward the right, as shown in FIGURES 4, 6, 7, and 8, being driven by the sprockets 88 and chains 90 to which the carriage is connected by means of the arms 94 and 95, and the pins 92. As the carriage moves toward the right, a high voltage supply, not shown, is actuated for the corona 28, the high voltage being connected to the corona by a buss bar and sliding contact, not shown. Since the magnet 42 is retained in the raised position shown in FIGURE 7, it does not pick up any mixture of toner and carrier from the tray 31 and, during the passage of the carrier across the electrophotographic material during the charging cycle, shown in FIGURE 7, the electrophotographic material is electrostatically charged only.

Upon the return of the carriage to position 1 shown in FIGURE 8 of the drawings, the exposure cycle begins and the latching cams 46 are automatically lowered, the drive motor is shut off, and the high voltage switch, not shown, is opened. The illuminating lamps 12, in the upper portion of the housing 2, are also automatically actuated and the length of exposure is adjusted by means of the automatic timer 5 on the right-hand side of the housing in FIGURE 1.

At the end of the exposure cycle, the toning cycle begins. The drive motor is actuated and with the latch cams 46 in the lowered position, the magnet 42 which is now unlatched, rides down the magnet cams 70, supported by the magnet wheels 66, and, at the lower end of the magnet cams 70, the magnet will be in position 2 shown in FIGURE 8. At this point, a large quantity of the carrier-toner mixture 32 will adhere, by magnetic attraction, to the plastic membrane over the end of the housing 40. As the carriage 26 continues to move to the right, as shown in FIGURE 8, the housing 40 with the magnet 42 in the lowered position rides up over the housing cams 58 and, at the ends of the housing cams, the axle 62 engages with the projections 60 on the latches 36. In this position, the housing 40 and the magnet 42 are conveyed across the exposed electrophotographic material thereby developing the electrostatic image thereon. Upon return of the carriage to the left, as shown in FIGURE 8, the magnet 42 is raised by the magnet cams 70 and the magnetic field is removed from the plastic membrane 74, as a result of which the toner adhering thereto drops back into the toner tray 31 where it is thoroughly mixed by the action of the stirring means 34. The developed electrophotographic material can now be removed from the door 20 for fixing of the image.

Other desirable features of the present invention not shown in the drawings are a door at the left-hand side of the device, as viewed in FIGURE 1, which permits removal of the toner tray 31 for replenishment of the carrier-toner mixture. A door at the right-hand side of the device, as shown in FIGURE 1, permits access to a housing containing a filter bag which retains any developer powder passing through the openings in the vacuum platen 22 and also contains a filter cartridge which absorbs ozone formed by the corona discharge. The vacuum platen 22 is interchangeable to accommodate different sizes of electrophotographic material.

The high voltage supply to the corona includes means for adjusting the voltage and also a milliammeter upon which the magnitude of the charging current can be read. It also contains a low voltage source which connects to the carriage 26 through a buss bar and sliding contact and which permits the application of a negative bias to the carriage 26 during the toning cycle shown in FIGURE 8. This is a desirable feature for the repression of residual background on the electrophotographic material.

It will be obvious to those skilled in the art that many modifications may be made within the scope of the present invention without departing from the spirit thereof, and the invention includes all such modifications.

What is claimed is:

1. An electrophotographic apparatus comprising upper and lower housing portions, a container for toner and means for holding an electrophotographic material in the lower housing, a carriage carrying an electrostatic charging means and a toning means thereon mounted for horizontal reciprocation in the lower housing, means for operating the charging means and the toning means, and means in the upper housing for projecting a light image on the electrophotographic material.

2. An apparatus according to claim 1 in which the means for operating the toning means includes a latch and cam assembly.

3. An apparatus according to claim 1 in which the carriage mounted for horizontal reciprocation includes means for reciprocating the toning means vertically during a portion of the horizontal reciprocation.

4. An apparatus according to claim 1 in which the toning means includes magnet means mounted for vertical reciprocation.

5. An apparatus according to claim 1 in which the carriage mounted for horizontal reciprocation includes follower means connected to the toning means which ride over a cam during a portion of the horizontal reciprocation, thereby reciprocating the toning means vertically.

6. An apparatus according to claim 1 in which the toning means includes magnet means having follower means connected thereto which ride over a cam during a portion of the horizontal reciprocation, thereby reciprocating the magnet means vertically.

References Cited by the Examiner

UNITED STATES PATENTS

| 2,791,949 | 5/1957 | Simmons et al. | 95—1.7 |
| 2,984,163 | 5/1961 | Giaimo | 95—1.7 |
| 3,019,714 | 2/1962 | Teiser et al. | 95—1.7 |

EVON C. BLUNK, *Primary Examiner.*